(12) United States Patent
Wood

(10) Patent No.: US 7,350,872 B2
(45) Date of Patent: Apr. 1, 2008

(54) GRAVITY DISCHARGE GRAIN WAGON HAVING AN ADJUSTABLE DISCHARGE CHUTE ASSEMBLY

(75) Inventor: James E. Wood, Ft. Recovery, OH (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 0 days.

(21) Appl. No.: 11/386,398

(22) Filed: Mar. 22, 2006

(65) Prior Publication Data

US 2007/0222273 A1    Sep. 27, 2007

(51) Int. Cl.
    *B60P 1/04* (2006.01)
(52) U.S. Cl. ....................................................... 298/18
(58) Field of Classification Search ................... 298/18
    See application file for complete search history.

(56) References Cited

U.S. PATENT DOCUMENTS

| 511,332 | A | | 12/1893 | Harris | |
|---|---|---|---|---|---|
| 2,573,714 | A | | 11/1951 | Karl | |
| 2,827,204 | A | | 3/1958 | McCurdy | |
| 3,095,073 | A | * | 6/1963 | Larson et al. | 193/33 |
| 3,240,164 | A | * | 3/1966 | Flowers | 105/276 |
| 3,424,498 | A | * | 1/1969 | Glenway, Jr. | 298/7 |
| 3,667,400 | A | * | 6/1972 | Damy | 105/239 |
| 3,700,283 | A | * | 10/1972 | Birdsall | 298/7 |
| 3,738,707 | A | * | 6/1973 | Bieber | 298/18 |
| 3,937,502 | A | * | 2/1976 | Gay | 298/11 |
| 4,024,939 | A | * | 5/1977 | Grieshop et al. | 193/5 |
| 4,122,932 | A | * | 10/1978 | Neubert et al. | 193/5 |
| 4,552,291 | A | * | 11/1985 | Schott | 255/96.5 |
| 4,646,942 | A | * | 3/1987 | Kuhns | 222/144.5 |
| 5,255,769 | A | * | 10/1993 | Echelberger | 193/4 |
| 5,501,402 | A | * | 3/1996 | Jones | 239/650 |
| 6,095,616 | A | | 8/2000 | Grieshop | |
| 2007/0046093 | A1 | * | 3/2007 | Young | 298/24 |

OTHER PUBLICATIONS

Publication of Unverferth Manufacturing Company, Inc., p. 9 entitled "Adjustable Chute"—1998.

* cited by examiner

*Primary Examiner*—Hilary Gutman
(74) *Attorney, Agent, or Firm*—Jacox, Meckstroth & Jenkins

(57) ABSTRACT

A wheel supported grain wagon includes a container with sloping side walls extending to an incline bottom wall, and a gravity discharge opening is formed within one of the side walls adjacent the bottom wall. A door panel is supported by tracks for movement between an upper open position and a lower close position covering the opening. A grain discharge chute extends from the opening and has opposite side walls connected by a bottom wall. The chute is adjustably supported by a pair of horizontally aligned pivot pins projecting into corresponding slots within a pair of side support brackets secured to the container. The slots extend generally perpendicular to the side wall and have longitudinally spaced bottom notches which selectively receive the pivot pins in response to manually lifting and shifting the discharge chute for selectively positioning the outer edge of the discharge chute at different elevations.

12 Claims, 2 Drawing Sheets

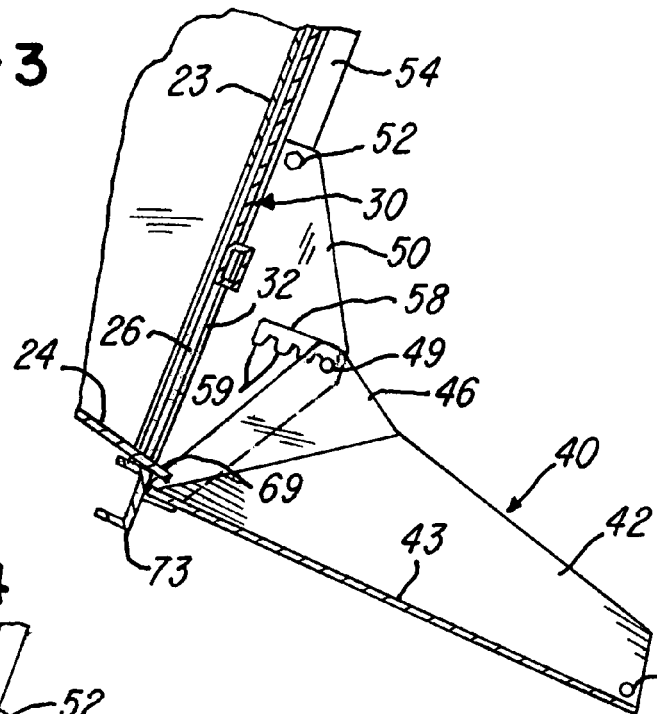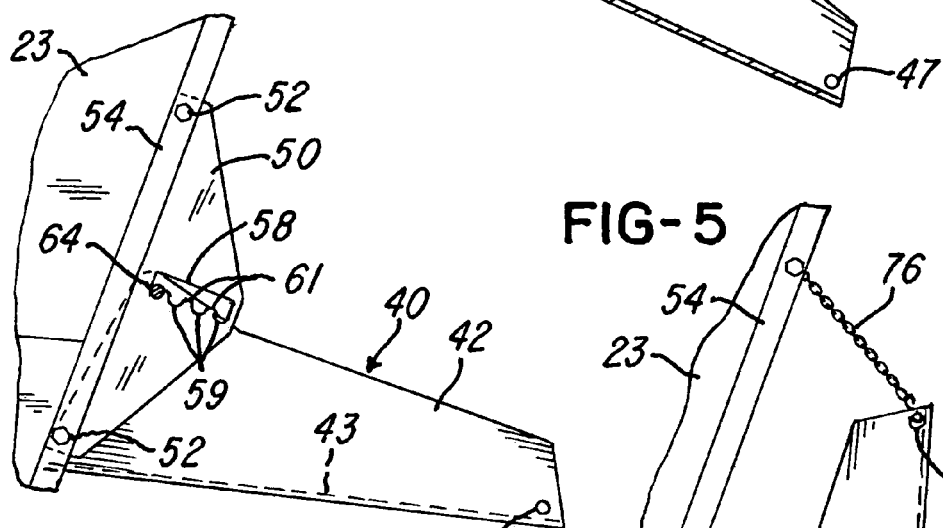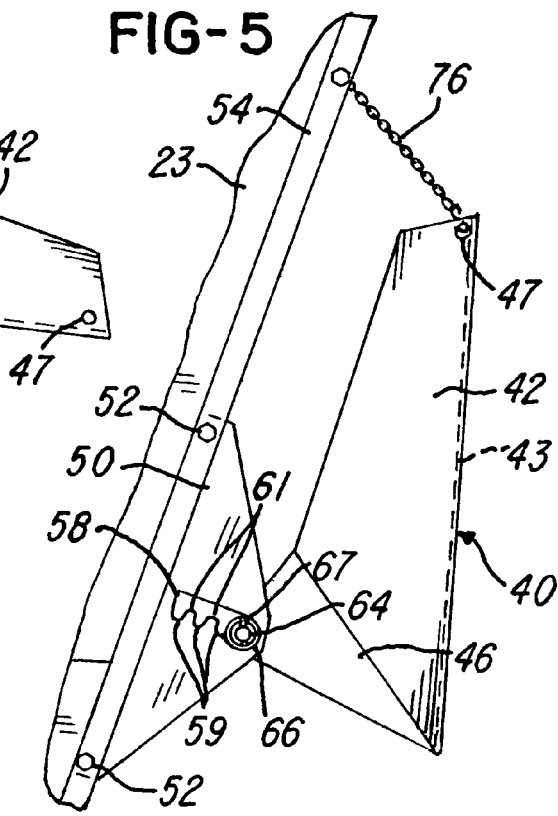

GRAVITY DISCHARGE GRAIN WAGON HAVING AN ADJUSTABLE DISCHARGE CHUTE ASSEMBLY

BACKGROUND OF THE INVENTION

This invention relates to a gravity discharge grain wagon of the general type disclosed in U.S. Pat. Nos. 4,024,939 and 6,095,616 which issued to the assignee of the present invention and the disclosures of which are herein incorporated by reference. Such grain wagons are commonly used for transporting a granular material such as grain from a grain harvester or combine within a field to an auger hopper of a grain elevator which elevates the grain and directs it into a storage bin. As shown in the above patents, such a gravity discharge grain wagon commonly has a discharge chute which projects laterally from a discharge outlet or opening within a side wall of the grain cart bin or container adjacent a sloping bottom wall of the container. The discharge chute directs the grain from the container into the auger hopper inlet of the grain elevator and may be pivoted to an upwardly projecting storage position when the chute is not in use, for example, as shown in above-mentioned U.S. Pat. No. 4,024,939.

As a result of using such a grain wagon, it has been found desirable to provide for vertically adjusting the outer end of the discharge chute for accommodating various grain elevator auger hoppers having inlets at various heights above the ground. It has also been found desirable to provide for quickly and easily adjusting the outlet height of the discharge chute without requiring the use of tools or significant time. One form of grain wagon having an adjustable unloading or discharge chute has been made by Unverferth Manufacturing in Kalida, Ohio. This adjustable chute uses an adjusting bolt or screw and locknut under the unloading chute as a stop. When it is desired to lower the height of the outer edge of the chute, the chute is pivoted upwardly, and the adjusting bolt or screw is threaded inwardly with wrenches so that the head portion of the adjusting screw allows the chute to pivot further downwardly. When the adjusting bolt or screw is threaded outwardly, the head portion stops the chute so that the outer edge is elevated. Other forms of either fixed or adjustable gravity discharge chutes are disclosed in U.S. Pat. Nos. 511,332, 2,573,714 and 2,827,204.

SUMMARY OF THE INVENTION

The present invention is directed to a gravity discharge grain wagon of the type described above in U.S. Pat. No. 6,095,616 and having an improved adjustable discharge chute assembly which provides all of the desirable features mentioned above. That is, the chute assembly provides for conveniently and quickly adjusting the height of the outer end of the discharge chute relative to the ground and without the use of any tools. In accordance with the illustrated embodiment of the invention, the discharge chute assembly includes a pair of horizontally spaced vertical support brackets or plates mounted on a side wall of the wagon container, and each bracket has an elongated slot extending generally perpendicular to the side wall and with a plurality of longitudinally spaced notches or recesses within the bottom edge of the slot.

A discharge chute has converging side walls integrally connected by a bottom wall, and the side walls have inner parallel flange portions which extend between the brackets mounted on the container side wall. A set of horizontally aligned pivot pins extend through the inner flange portions of the chute and into the slots within the support brackets and provide for selectively engaging the recesses within the bottom of the slots. The inner edge of the bottom wall of the chute seats under the sloping bottom wall of the container along the bottom of the discharge opening within the side wall. The elevation of the outer edge of the chute may be conveniently adjusted simply by lifting the chute slightly upwardly and resetting the pivot pins in another set of horizontally aligned notches or recesses within the support bracket. The chute may also be pivoted upwardly to a storage position for transporting the wagon.

Other features and advantages of the invention will be apparent from the following description, the accompanying drawings and the appended claims.

BRIEF DESCRIPTION OF THE DRAWINGS

FIGS. 3 & 4 are elevational views showing the discharge chute in two of the selectable positions on the grain wagon for grain discharge; and FIG. 5 is an elevational view of the chute assembly in a storage position for transport of the wagon.

DESCRIPTION OF THE PREFERRED EMBODIMENT

Figure 1:
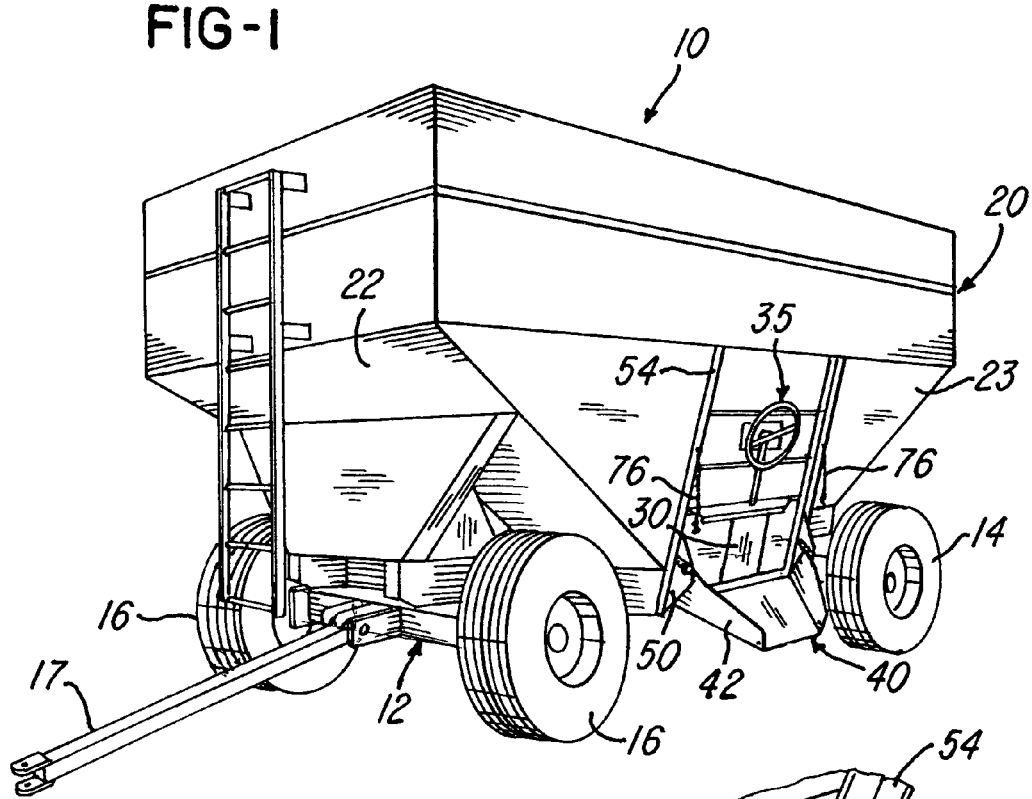
FIG. 1 is a perspective view of a gravity discharge grain wagon having an adjustable discharge chute assembly constructed in accordance with the invention.
Figure 2:
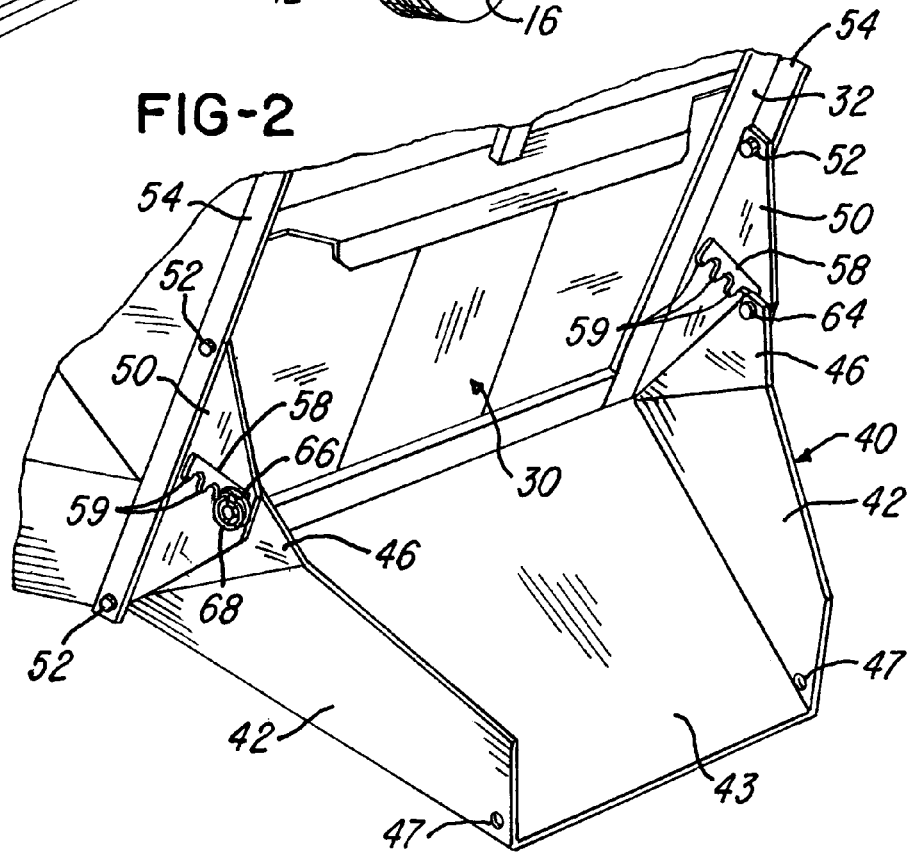
FIG. 2 is an enlarged perspective view of the chute assembly shown in FIG. 1.

FIG. 1 illustrates a wheel supported cart or wagon 10, commonly used for transporting a flowable granular material such as grain, and which includes a frame 12 supported by a pair of rear wheels 14 and a pair of front wheels 16 steerable by a tow bar 17 which is usually hitched to a tow vehicle such as a tractor used for pulling the wagon. The frame 12 supports an open top gravity discharge hopper bin or container 20 having inclined side walls 22 and 23 extending upwardly from an inclined bottom wall 24 (FIG. 2). The open top container 20 defines a chamber which is adapted to receive a granular material such as grain or fertilizer, and the material or grain is discharged through a rectangular bottom discharge opening or outlet 26 (FIG. 3) formed within the left side wall 23 and extending upwardly from the bottom wall 24. The discharge opening 26 is normally closed by a sliding door 30 supported by parallel spaced tracks 32 mounted on the side wall 23, and the door 30 is moved between an upper open position and a lower closed position (FIG. 2) in response to actuation of a wheel operated mechanism 35. The door 30 and actuating mechanism 35 may be constructed as disclosed in above-mentioned U.S. Pat. No. 6,095,616.

In accordance with the present invention, an inclined tapered discharge chute 40 includes converging side walls 42 integrally connected by a flat bottom wall 43. The side walls 42 have integrally formed inner triangular flange portions 46 which extend in parallel vertical planes. The outer end portions of the side walls 42 have openings or holes 47, and the inner flange portions 46 of the side walls 42 have horizontally aligned openings or holes 49 (FIG. 3).

The discharge chute 40 is supported by a pair of horizontally spaced vertical plates or brackets 50 which are secured by bolts 52 to parallel spaced right angle strips 54 secured or welded to the side wall 23 of the container 20. Each of the brackets 50 is formed with an elongated slot 58 which extends generally perpendicular or normal to the container side wall 23, and the bottom of each slot 58 is formed with longitudinally spaced notches or recesses 59 defined between longitudinally spaced teeth 61.

A pair of pivot pins 64 extend through the corresponding holes 49 within the inner flange portion 46 of the discharge chute 40 and also extend through the corresponding slots 58. Preferably, the pivot pins 64 have enlarged head portions adjacent the inner surfaces of the flange portions 46 and have outer end portions with cross holes which receive washers 66 and cross retaining pins 67 each attached to an overcenter snap ring 68. However, the pivot pins 64 may be in other forms such as bolts and screws. As shown in FIG. 3, the inner edge of the bottom wall 43 of the chute 40 extends under a projecting portion 69 of the bottom wall 24 and normally seats or engages a horizontal channel member 73 forming part of the frame 12.

As apparent from FIGS. 2-4, the discharge chute 40 may be conveniently adjusted to position an outer edge of the chute at different elevations simply by lifting the chute 40 slightly and resetting the pivot pins 64 in a different set of laterally aligned notches or recesses 59. For example, FIG. 3 illustrates the discharge chute 40 with its outer edge in its lowest position, and FIG. 4 shows the chute 40 with its outer edge adjusted to its highest position. For example, when the chute 40 is in its lowest position (FIG. 3), the outer edge of the chute is about 14 inches above the ground. When the chute 40 is in its upper discharge position (FIG. 4), the outer edge of the chute is about 19 inches above the ground. After the desired amount of material or grain is discharged from the container 20 through the chute 40, the door 30 is moved downwardly to its closed position. The chute 40 may then be pivoted to its stored position (FIG. 5) where the chute 40 is retained by hooks on the outer end of the pair of chains 76 attached to the angle strips 54.

From the drawings in the above description, it is apparent that a gravity discharge grain wagon having a discharge chute assembly constructed in accordance with the invention, provides desirable features and advantages. For example, the outer edge of the discharge chute 40 may be conveniently positioned at different elevations without the use of any tools simply by lifting the chute 40 slightly and resetting the pivot pins 64 within another set of notches or recesses 59. If it is desired to discharge the grain directly downwardly from the outer edge portion 69 of the bottom wall 24, the discharge chute may be conveniently removed by removing the pivot pins 64 or the discharge chute may be pivoted to its inoperable storage position shown in FIG. 5. Thus the grain wagon 10 is suited to discharge grain into auger hoppers having top inlets at various heights.

While the form of wagon and chute assembly herein described constitutes a preferred embodiment of the invention, it is to be understood that the invention is not limited to this precise form of assembly, and that changes may be made therein without departing from the scope and spirit of the invention as defined in the appended claims.

What is claimed is:

1. A wheel supported wagon for transporting a flowable granular material, said wagon comprising a container adapted to receive a volume of the material, said container having side walls and a sloping bottom wall with one of said side walls defining a discharge outlet adjacent said bottom wall, a door supported for movement between a retracted open position and a close position covering said discharge outlet, an inclined discharge chute projecting outwardly from said discharge outlet and having opposite side wall members connected by a bottom wall member, a set of horizontally spaced support members adjacent said side wall members of said chute and rigidly connected to said container, adjustable supports connecting said side wall members of said chute to the corresponding adjacent said support members, and said adjustable supports providing for changing the inclined angle of said discharge chute in response to lifting and shifting said discharge chute relative to said support members.

2. A wagon as defined in claim 1 wherein said adjustable supports comprise an opening with spaced notches within each of said support members, and a set of pivot pins connected to said side wall members of said chute and projecting into a set of said notches.

3. A wagon as defined in claim 2 wherein each of said support members comprises a flat support plate having a uniform thickness, and one of said openings and corresponding spaced notches within each said plate.

4. A wagon as defined in claim 1 wherein said adjustable supports comprise a set of horizontally aligned pivot pins received within a corresponding set of selected notches within openings each having a plurality of selectable notches.

5. A wagon as defined in claim 1 wherein said side wall members of said chute include converging portions extending from parallel spaced end portions disposed between said support members.

6. A wheel supported wagon for transporting a flowable granular material, said wagon comprising a container adapted to receive a volume of the material, said container having side walls and a sloping bottom wall with one of said side walls defining a discharge outlet adjacent said bottom wall, a door supported for movement between a retracted open position and a close position covering said discharge outlet, an inclined discharge chute projecting outwardly from said discharge outlet and having opposite side wall members connected by a bottom wall member, a set of horizontally spaced support members adjacent said side wall members of said chute and rigidly connected to said container, adjustable supports connecting said side wall members of said chute to the corresponding adjacent said support members, said adjustable supports including a set of pivot pins extending through corresponding openings within two of said members, and said openings having spaced recesses for selectively receiving said pivot pins in response to lifting and repositioning said discharge chute for changing the inclined angle of said discharge chute.

7. A wagon as defined in claim 6 wherein each of said support members comprises a support bracket having a slot forming said opening, each said slot extends generally perpendicular to said one of said side walls of said container, and each said slot having longitudinally spaced said recesses.

8. A wagon as defined in claim 7 wherein said pivot pins project outwardly from said side wall members of said chute through corresponding said slots within said support brackets.

9. A wagon as defined in claim 6 wherein said support members comprise parallel spaced flat support plates, and one of said openings within each of said support plates.

10. A wheel supported wagon for transporting a flowable granular material, said wagon comprising a container adapted to receive a volume of the material, said container having side walls and a sloping bottom wall with one of said side walls defining a discharge outlet adjacent said bottom wall, a door supported for movement between a retracted open position and a close position covering said discharge outlet, an inclined discharge chute projecting outwardly from said discharge outlet and having opposite side walls with parallel spaced end portions and connected by a bottom wall, a set of horizontally spaced vertical support brackets adjacent said end portion of said side walls of said chute and rigidly connected to said container, a set of pivot pins connected to said end portions of said side walls of said chute, said support brackets each having an opening with a series of spaced recesses, and said recesses selectively receive said pivot pins in response to lifting and shifting said discharge chute for changing the inclined angle of said discharge chute.

11. A wagon as defined in claim 10 wherein each of said support brackets has a slot forming said opening and extending generally perpendicular to said one of said side walls of said container, and each said slot having longitudinally spaced said recesses.

12. A wagon as defined in claim 10 wherein each of said support brackets comprises a flat support plate, and one of said openings within each said support plate.

* * * * *